(12) United States Patent
Shen et al.

(10) Patent No.: US 7,787,072 B2
(45) Date of Patent: Aug. 31, 2010

(54) LIQUID CRYSTAL DISPLAY DEVICE

(75) Inventors: Rui-Ye Shen, Shenzhen (CN); Su-Sheng Mong, Miao-Li (TW); Te-Hsu Wang, Miao-Li (TW)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 580 days.

(21) Appl. No.: 11/899,185

(22) Filed: Sep. 4, 2007

(65) Prior Publication Data
US 2008/0055514 A1 Mar. 6, 2008

(30) Foreign Application Priority Data
Sep. 1, 2006 (TW) ............................... 95132365 A

(51) Int. Cl.
*G02F 1/1333* (2006.01)
*G02F 1/1345* (2006.01)

(52) U.S. Cl. ............................. 349/60; 349/58; 349/59; 349/149; 349/150; 349/151; 349/152; 362/632; 362/634; 361/681; 345/87

(58) Field of Classification Search .................. 362/632, 362/633, 634; 349/58–60, 149–152
See application file for complete search history.

(56) References Cited

U.S. PATENT DOCUMENTS

| 5,978,211 | A | 11/1999 | Hong |
| 6,268,998 | B1 | 7/2001 | Cho |
| 7,150,635 | B2 * | 12/2006 | Ostmoe et al. ............... 439/135 |
| 7,492,433 | B2 * | 2/2009 | Imajo et al. .................. 349/149 |
| 7,586,744 | B2 * | 9/2009 | Okuda .................... 361/679.56 |
| 7,623,195 | B2 * | 11/2009 | Park et al. ....................... 349/58 |
| 2007/0076397 | A1 * | 4/2007 | Kanayama et al. ........... 361/800 |

FOREIGN PATENT DOCUMENTS

CN 2352983 Y 12/1999

* cited by examiner

*Primary Examiner*—Julie-Huyen L Ngo
(74) *Attorney, Agent, or Firm*—Wei Te Chung

(57) ABSTRACT

A liquid crystal display device includes a liquid crystal display module, a circuit board, and a shield case. The circuit board is mounted on the liquid crystal display module and has a socket for receiving a power supply plug. The shield case includes an offset portion on a rear part to contain the circuit board. An opening formed with holding members for securing the socket is provided at the offset portion.

20 Claims, 3 Drawing Sheets

LIQUID CRYSTAL DISPLAY DEVICE

FIELD OF THE INVENTION

The present invention relates to an improved liquid crystal display device having means for fixing a power supply socket thereof securely in position.

GENERAL BACKGROUND

Presently, numerous electronic products are manufactured to feature high speed, high performance, small size, and low weight. Among these products, liquid crystal displays are becoming more and more popular due to their advantages of thinness, low weight, low power consumption, and low radiation.

Referring to FIG. 5 and FIG. 6, a liquid crystal display 1 includes a liquid crystal display module 14, a circuit board 13, a metal shield case 11, and a stand 12. The circuit board 13 is fixed onto a rear of the liquid crystal display module 14. The metal shield case 11 has an offset portion 111. The offset portion 111 is slightly larger than the circuit board 13 in area. When the metal shield case 11 and the liquid crystal display module 14 are assembled together, the circuit board 13 is received in the offset portion 111. The stand 12 includes a flat base, and a connecting member extending up from the flat base. The connecting member is connected to a lower end of the metal shield case 11 so that the stand 12 provides a support for the combined metal shield case 11 and liquid crystal display module 14.

The circuit board 13 has a socket 131 (also known as a DC jack) set on a bottom thereof. The socket 131 is for receiving an external power supply plug 16 for the liquid crystal display 1. An opening 112 for the power supply plug 16 to pass through is defined in a corresponding position of the offset portion 111 of the metal shield case 11. Thus when the metal shield case 11 and the liquid crystal display module 14 are assembled together, the opening 112 is aligned with the socket 131. The power supply plug 16 can thus be attached to the socket 131 via the opening 112 when the circuit board 13 needs an external power supply, and can be detached from the socket 131 when the liquid crystal display 1 is to be moved.

However, frequent attaching and detaching of the power supply plug 16 is apt to cause the socket 131 to move, detach, or even break off and be damaged. When this happens, the circuit board 13 is liable to be damaged. Thus, a solution to these problems is needed.

SUMMARY

A liquid crystal display includes a liquid crystal display module, a circuit board, and a shield case. The circuit board is mounted on the liquid crystal display module and includes a socket for receiving a power supply plug. The shield case receives the liquid crystal display module and has an offset portion for receiving the circuit board. The offset portion has an opening surrounded by a fastening element including a plurality of holding members for securing the socket when the shield case and the liquid crystal module are assembled.

In one embodiment, the fastening element includes a protruding portion and a plurality of raised portions extending from side edges of the opening to constrain two horizontal and one vertical movements of one part of the socket such that the socket is secured in position when the shield case and the liquid crystal module are assembled.

As a result, the raised portions at the opening of the metal shield case of the liquid crystal display form the fastening element to secure the socket while detaching or attaching the external power supply plug. Consequently, the circuit board of the liquid crystal display can be protected from being damaged.

Other novel features and advantages will become more apparent from the following detailed description when taken in conjunction with the accompanying drawings.

DETAILED DESCRIPTION OF PREFERRED EMBODIMENTS

Figure 1:
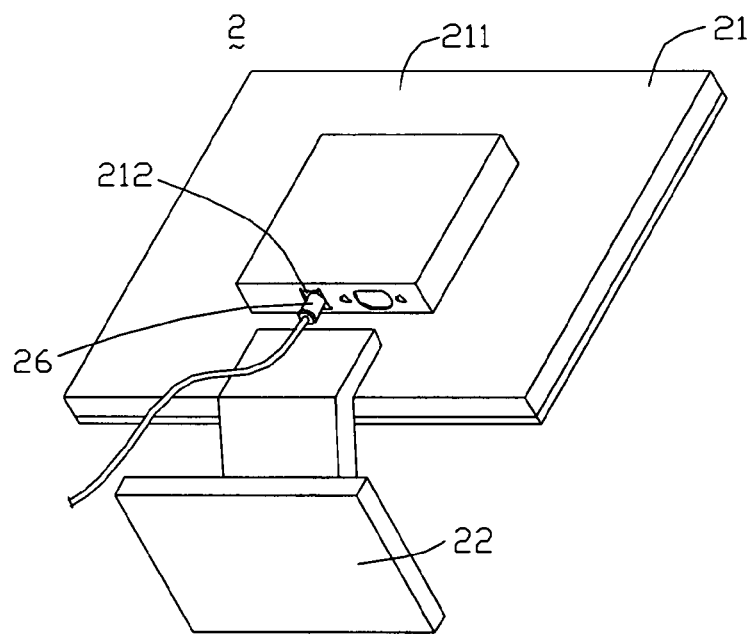
FIG. 1 is a perspective view showing rear and bottom parts of a liquid crystal display according to one embodiment of the present invention.
Figure 2:
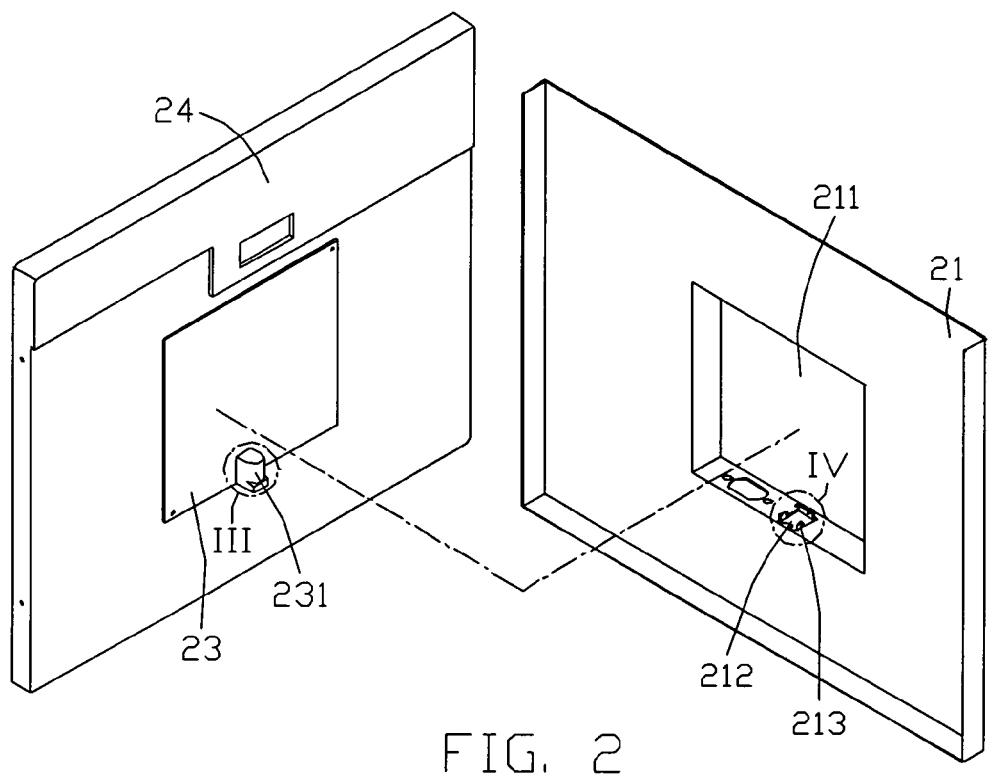
FIG. 2 is an exploded, perspective view showing a metal shield case and a liquid crystal display module of the liquid crystal display of FIG. 1.

Referring to FIG. 1 and FIG. 2, a liquid crystal display 2 according to one embodiment of the present invention includes a liquid crystal display module 24, a circuit board 23, a metal shield case 21, and a stand 22. The circuit board 23 is mounted onto a rear part of the liquid crystal display module 24. The metal shield case 11 has an offset portion 211. The offset portion 211 is slightly larger than the circuit board 23 in area. When the metal shield case 21 and the liquid crystal display module 24 are assembled together, the circuit board 23 is received in the offset portion 211. The stand 22 includes a flat base, and a connecting member extending up from the flat base. The connecting member is connected to a lower end of the metal shield case 21, so that the stand 22 provides a support for the combined metal shield case 21 and liquid crystal display module 24.

The socket 231 is for receiving an external power supply plug 26 for the liquid crystal display 2, and is set on a bottom portion of the circuit board 23. An opening 212 for the power supply plug 26 to pass through is defined in a corresponding position of the offset portion 211 of the metal shield case 21. The offset portion 211 also has a fastening element 213 that is provided at the opening 212, and includes a plurality of holding members extending from a plurality of side edges of the opening. When the metal shield case 21 and the liquid crystal display module 24 are assembled together, the opening 212 is aligned with the socket 231, and the holding members of the fastening element 213 secures the socket 231 in position. Meanwhile, an upper end of the stand 22 at the metal shield case 21 faces the opening 212. The power supply plug 26 can thus be attached to the socket 231 via the opening 212 when the circuit board 23 needs an external power supply, and can be detached from the socket 231 when the liquid crystal display 2 is to be moved.

Figure 3:
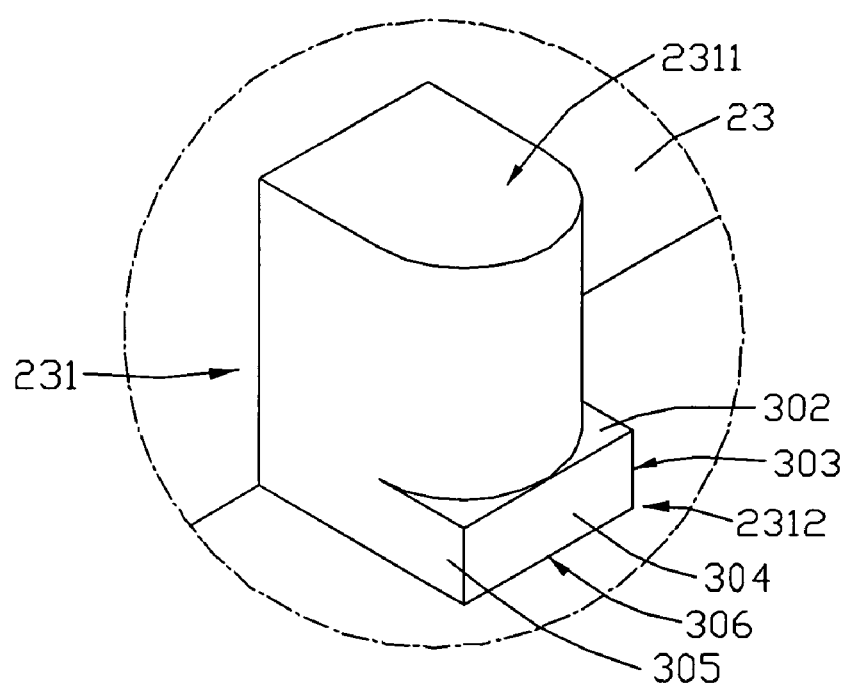
FIG. 3 is an enlarged view of a circled portion III of FIG. 2, showing a socket thereof.

Referring to FIG. 3, this enlarged view shows that the socket 231 comprises a main body 2311 and a rectangular base 2312. The main body 2311 is semicylindrical at one side thereof. The rectangular base 2312 includes a top surface 302, a bottom surface 306, a right side surface 303, a left side surface 305, and a rear side surface 304. The rear side surface 304 is parallel to a plane of the circuit board 23. The top, bottom, right side, and left side surfaces 302, 306, 303, and 305 are all perpendicular to the rear side surface 304. The top and bottom surfaces 302 and 306 are at opposite sides of the rectangular base 2312, and are parallel to each other. The right side and left side surfaces 303 and 305 are at opposite sides of the rectangular base 2312, and are parallel to each other.

The top surface 302 adjoins a bottom portion of the main body 2311. After the liquid crystal display 2 has been assembled, the bottom surface 306 is adjacent to the opening 212. The rectangular base 2312 is shorter than the main body 2311 in height. That is, a vertical distance from the top surface 302 to the bottom surface 306 is less than a vertical distance from the top surface 302 to a top surface of the main body 2311. A transverse (horizontal) cross-sectional area of the rectangular base 2312 is larger than a transverse (horizontal) cross-sectional area of the main body 2311.

Figure 4:
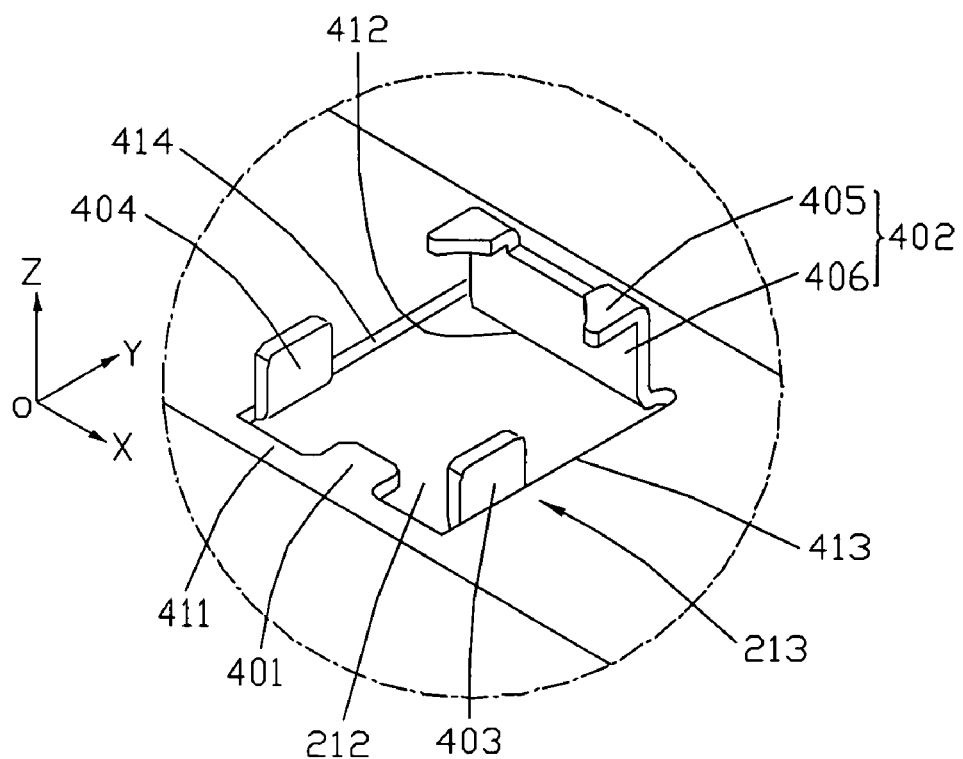
FIG. 4 is an enlarged view of a circled portion IV of FIG. 2, showing a fastening element of the metal shield case.
Figure 5:
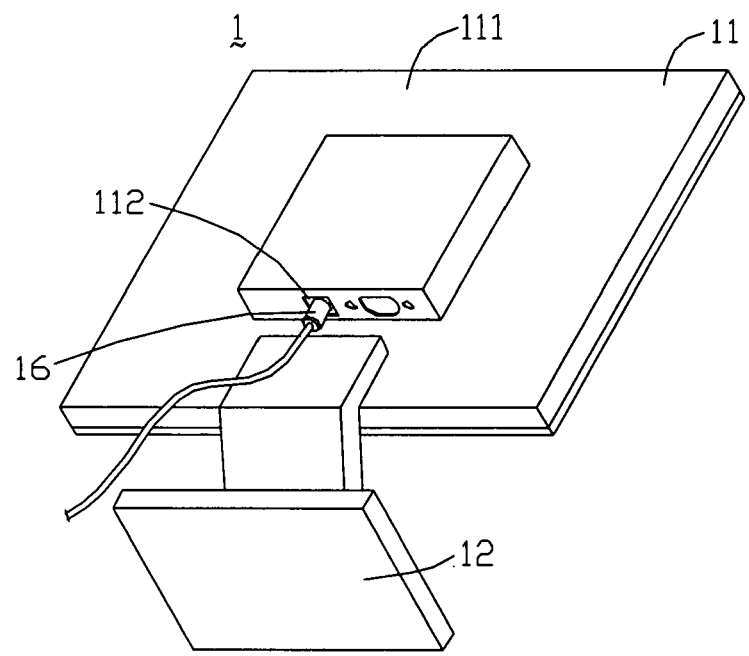
FIG. 5 is a perspective view showing rear and bottom parts of a conventional liquid crystal display.
Figure 6:
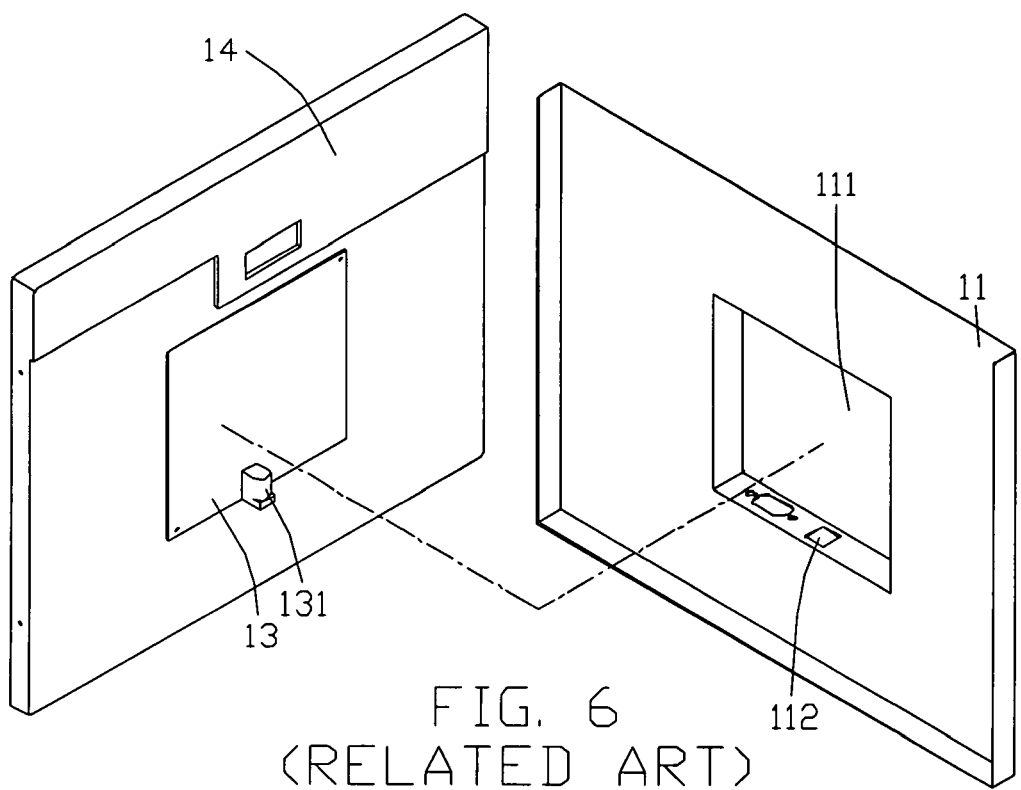
FIG. 6 is an exploded, perspective view showing a metal shield case and a liquid crystal display module of the liquid crystal display of FIG. 5.

Referring to FIG. 4, the opening 212 is surrounded by a front side edge 411, a rear side edge 412, a right side edge 413, and a left side edge 414. The front side edge 411 is parallel to but spaced a distance away from a rear panel of the offset portion 211. The rear side edge 412 is parallel to and opposite the front side edge 411. The right side edge 413 and the left side edge 414 are parallel and opposite to each other, and interconnect the front and rear side edges 411 and 412. In other words, the right side edge 413 and the left side edge 414 are located between the front side edge 411 and the rear side edge 412. The front side edge 411 is parallel to an X-axis of a defined Cartesian coordinate (X-Y-Z) system. The right side edge 413 and the left side edge 414 are parallel to a Y-axis of the Cartesian coordinate system. The rear side edge 412 is parallel to the X-axis of the Cartesian coordinate system.

The fastening element 213 is formed with a front protruding portion 401, a rear raised portion 402, a right raised portion 403, and a left raised portion 404, serving as the holding members. The front protruding portion 401 extends from the front side edge 411 into the opening 212. That is, the front protruding portion 401 is parallel to a plane of the opening 212, extends in a positive direction parallel to the Y-axis. The rear raised portion 402 has a hook-like configuration. In particular, the rear raised portion 402 includes a main body 406 extending up from the rear side edge 412 in a positive direction parallel to the Z-axis, and a pair of claws 405 extending from the main body 406 in a negative direction parallel to the Y-axis. In other words, the main body 406 is substantially perpendicular to the plane of the opening 212, while the claws 405 are parallel to the plane of the opening 212. A vertical distance between the front protruding portion 401 and the claws 405 is equal to the height of the rectangular base 2312. The right and left raised portions 403 and 404 extend up from the right and left side edges 413 and 414, respectively, in the positive Z-axis direction. In other words, the right and left raised portions 403 and 404 are perpendicular to the plane of the opening 212. A horizontal distance between the right and left raised portions 403 and 404 is equal to a corresponding horizontal width of the rectangular base 2312.

Thus, the front protruding portion 401 and the rear, right, and left raised portions 402, 403, and 404 cooperatively surround a space for receiving the rectangular base 2312. The front protruding portion 401 functions to abut against the bottom surface 306, the main body 406 functions to abut against the rear side surface 304, the claws 405 function to abut against the top surface 302, the right raised portion 403 functions to abut against the left side surface 305, and the left raised portion 404 functions to abut against the right side surface 303.

As a result, the front protruding portion 401 and the claws 405 together constrain Z-axis movement of the socket 231. The main body 406 and the circuit board 23 together constrain Y-axis movement of the socket 231. The right and left raised portions 403 and 404 together constrain X-axis movement of the socket 231. In other words, the front protruding portion 401 and the rear, right, and left raised portions 402, 403, and 404 at the opening 212 of the metal shield case 21 of the liquid crystal display 2 cooperatively form the fastening element 213. The fastening element 213 securely maintains the socket 231 in position while the external power supply plug 26 is attached to or detached from the socket 231, by constraining X-axis, Y-axis, and Z-axis movement of the rectangular base 2312 of the socket 231. Consequently, the circuit board 23 of the liquid crystal display 2 can be protected from being damaged.

Alternatively, the fastening element 213 can be formed with only the front protruding portion 401 and the rear raised portion 402. This is because Z-axis movement is the primary risk associated with the attaching and detaching of the power supply plug 26. Furthermore, the fastening element 213 is not limited to the above-described and illustrated structures. In alternative embodiments, the fastening element 213 can be configured otherwise, as long as the fastening element 213 at the opening 212 secures the socket 231 in position. Moreover, in other alternative embodiments, the fastening element 213 and the opening 212 can be provided elsewhere on the offset portion 211. For example, the fastening element 213 and the opening 212 can be provided at the rear panel of the offset portion 211.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms during which the appended claims are expressed.

What is claimed is:

1. A liquid crystal display device, comprising:
a liquid crystal display module;
a circuit board mounted on the liquid crystal display module, the circuit board being provided with a socket for receiving a power supply plug; and
a shield case receiving the liquid crystal display module, the shield case including an offset portion receiving the circuit board, the offset portion comprising an opening and a fastening element provided around the opening, the fastening element securing the socket in position.

2. The liquid crystal display device as set forth in claim 1, wherein the fastening element comprises a protruding portion extending from a first side edge of the opening into the opening.

3. The liquid crystal display device as set forth in claim 2, wherein the fastening element further comprises a first raised portion extending from a second side edge of the opening, the second side edge being opposite to the first side edge, the first raised portion comprising a first part perpendicular to a plane of the opening and a second part extending from the first part and being parallel to the plane of the opening.

4. The liquid crystal display device as set forth in claim 3, wherein the socket comprises a first body portion and a second body portion, a transverse cross-sectional area of the second body portion is larger than a transverse cross-sectional area of the first body portion, and the second body portion is constrained by the fastening element.

5. The liquid crystal display device as set forth in claim 4, wherein the second body portion is rectangular in shape.

6. The liquid crystal display device as set forth in claim 4, wherein a vertical distance between the second part of the first raised portion and the protruding portion of the fastening element is substantially equal to a height of the second body portion of the socket.

7. The liquid crystal display device as set forth in claim 5, wherein part of the first body is semicylindrical.

8. The liquid crystal display device as set forth in claim 3, wherein the fastening element further comprises a second raised portion extending from a third side edge of the opening and being perpendicular to the plane of the opening, the third side edge being located between the first side edge and the second side edge.

9. The liquid crystal display device as set forth in claim 8, wherein the fastening element further comprises a third raised portion extending from a fourth side edge of the opening and being perpendicular to the plane of the opening, the fourth side edge being located between the first side edge and the second side edge and opposite to the third side edge.

10. The liquid crystal display device as set forth in claim 9, wherein the socket comprises a first body portion and a second body portion, a transverse cross-sectional area of the second body portion is larger than a transverse cross-sectional area of the first body portion, and the second body portion is constrained by the fastening element.

11. The liquid crystal display device as set forth in claim 10, wherein the first part of the first raised portion and the circuit board together constrain a horizontal movement of the socket, and the second part of the first raised portion includes a pair of claw-like members for abutting a surface where the second body portion adjoins the first body portion, such that the second part of the first raised portion and the protruding portion together constrain a vertical movement of the socket.

12. The liquid crystal display device as set forth in claim 10, wherein a vertical distance between the protruding portion and the second part of the first raised portion of the fastening element is substantially equal to a height of the second body portion of the socket, and a horizontal distance between the second raised portion and the third raised portion is substantially equal to a corresponding width of the second body portion of the socket.

13. The liquid crystal display device as set forth in claim 10, wherein the second body portion is rectangular in shape.

14. The liquid crystal display device as set forth in claim 13, wherein part of the first body portion is semicylindrical.

15. The liquid crystal display device as set forth in claim 1, further comprising a stand attached to the shield case, wherein an end of the stand at the shield case faces the opening of the shield case.

16. A liquid crystal display device, comprising:
a liquid crystal display module;
a circuit board mounted on the liquid crystal display module, the circuit board being provided with a socket for receiving a power supply plug; and
a shield case receiving the liquid crystal display module, the shield case including an offset portion receiving the circuit board, the offset portion comprising an opening and a fastening element provided around the opening;
wherein the fastening element comprises a plurality of holding members extending from a plurality of side edges of the opening, the holding members constraining the socket therebetween such that the socket is secured in position.

17. The liquid crystal display device as set forth in claim 16, wherein the socket comprises a first body portion and a second body portion, a transverse cross-sectional area of the second body portion is larger than a transverse cross-sectional area of the first body portion, and the second body portion is constrained by the holding members.

18. The liquid crystal display device as set forth in claim 17, wherein the second body portion is rectangular in shape.

19. The liquid crystal display device as set forth in claim 17, wherein part of the first body portion is semicylindrical.

20. The liquid crystal display device as set forth in claim 17, wherein at least two of the holding members head directions that are perpendicular to each other.

* * * * *